Oct. 13, 1970  J. M. PEACOCK ET AL  3,534,149
COMMUNICATION CABLE SYSTEMS
Filed Dec. 6, 1966

INVENTORS J. M. PEACOCK
R. M. RILEY
BY
ATTORNEY

FIG. 6
FIG. 7
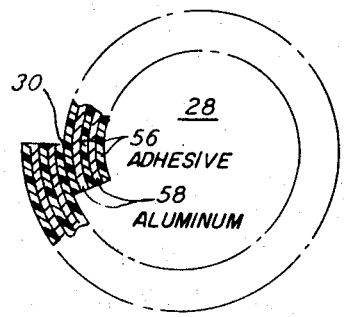
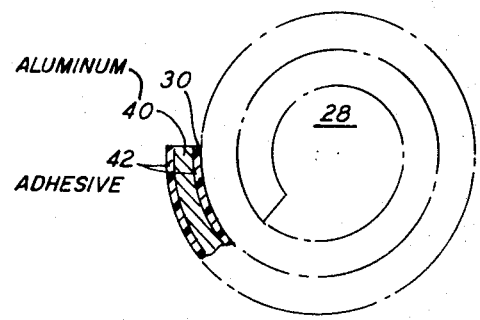
FIG. 8
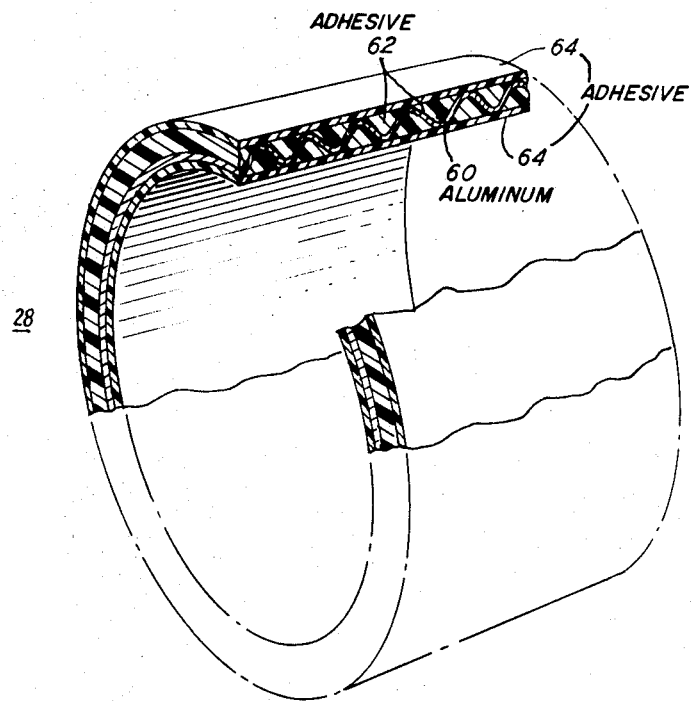

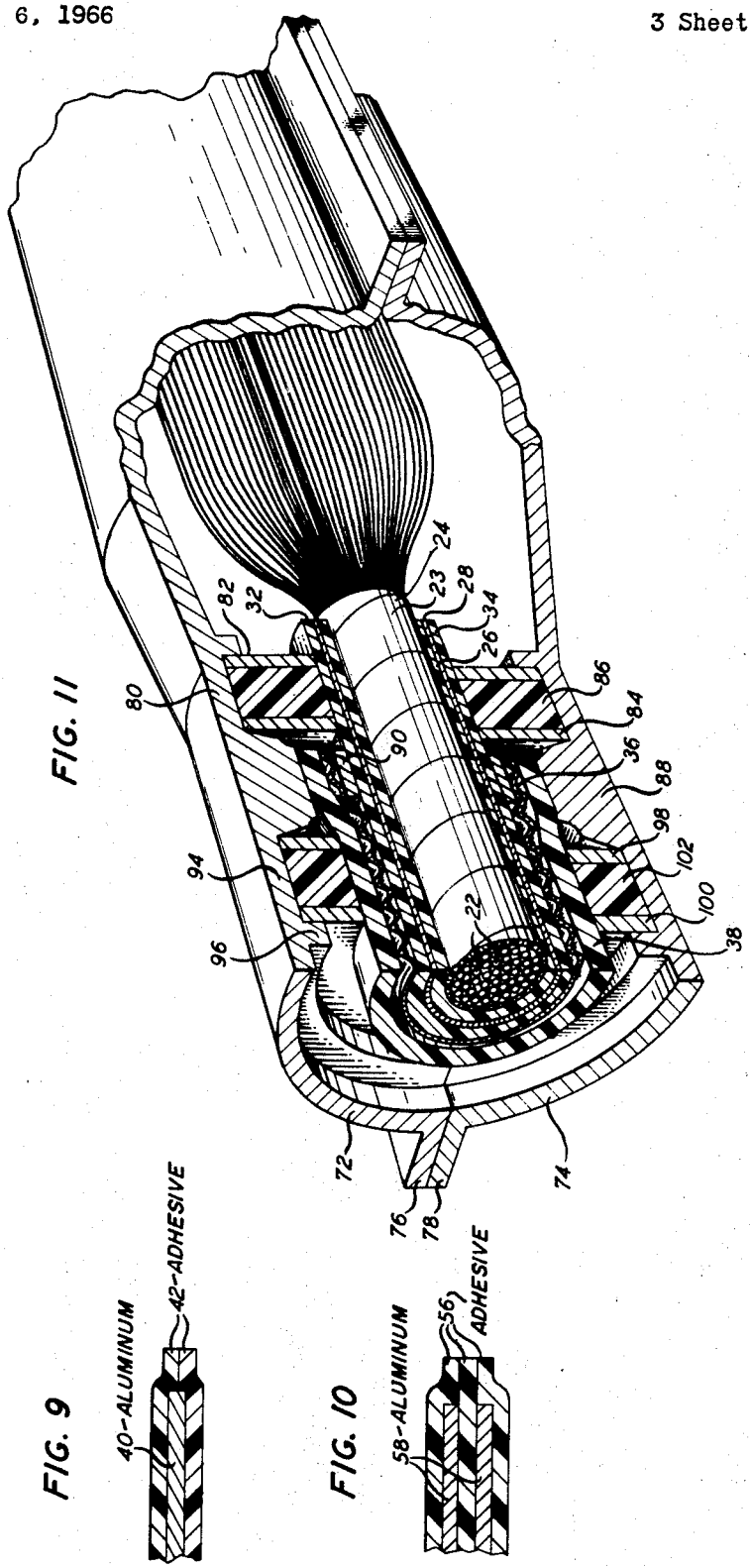

3,534,149
COMMUNICATION CABLE SYSTEMS
John M. Peacock, Baltimore, and Robert M. Riley, Timonium, Md., assignors to Bell Telephone Laboratories, Incorporated, Murray Hill, N.J., a corporation of New York
Filed Dec. 6, 1966, Ser. No. 599,587
Int. Cl. H01b 7/18
U.S. Cl. 174—105
3 Claims

ABSTRACT OF THE DISCLOSURE

A communication cable having a vapor barrier means and an electroconductive lightning shield with structural support means between and a thermoplastic protective sheathing.

---

This invention relates to electrical cables and particularly to buried underground communication cables and cable systems for carrying telephone messages.

Buried communication cables ordinarily possess one or more protective plastic jackets. These serve to prevent ambient ground water from entering the cable's conductive core and either impairing the cable's transmission performance generally or, by virtue of the electrical potentials on the conductors, causing electrolytic deterioration of the conductor metals. The plastic jackets together with insulation surrounding the conductors afford buried cables some short-term immunity from the effects of ground water. However, lightning, which inevitably strikes the cable during its 30-to-50 year life expectancy, usually punctures the plastic jackets. Water then rapidly enters the cable core. It causes considerable damage and deterioration of communication. The problem of electrolytic decomposition is especially critical when conductors are made of aluminum.

Even without lightning punctures, water eventually enters the cable core through the watertight plastic jacket or jackets. This occurs by the process of "pumping." Pumping works because even jackets made of the most impermeable plastic material available transmit water vapor from the liquid water surrounding the jackets into voids of the core in response to a positive vapor pressure differential, that is, a higher relative humidity or vapor paritial pressure outside the cable than inside the core. This tends to saturate the core's voids with water vapor. This vapor itself does not significant harm. However, when the temperature drops, vapor in the saturated core condenses and collects in the core interstices. When the temperature rises, however, the process is not fully reversible. The relative humidity inside the cable core lags significantly behind the vapor's partial pressure outside the cable. Thus, a rise in ambient temperature results in more vapor being drawn into the core. A drop in temperature condenses the vapor. As long as the voids in the core remain comparatively large, pumping continues to fill the core with water.

In some cables, attempts are made to protect an inner jacket from lightning strokes by surrounding the inner jacket with a metal shield and a surrounding outer plastic jacket. In other cables, attempts are made to prevent pumping by incorporating a vapor impervious metal barrier in the cable.

Even these expedients fail to eliminate entry of water into the core. The lightning shields are either not made watertight or, if they are, lightning or corrosion ultimately punctures or opens such shields. Water then entering the cable through the openings travels axially outside the inner jacket until pumping occurs throughout the cable. On the other hand, vapor-impervious metal barriers are also punctured by lightning. Moreover, they fail to form watertight seals with the cable splices joining adjacent cable lengths. Thus, water seeping into lightning punctures and flowing axially, ultimately spills into the cable splices. Here, it flows back to the core and into the cores of adjacent cable lengths.

In the copending applications of M. C. Biskeborn, Ser. No. 599,599, and G. H. Webster, Ser. No. 599,575, each filed concurently herewith and each assigned to the same assignee as this application, attempts were made to eliminate these difficulties. In the Biskeborn application this involved bonding a water-obstructing structural plastic jacket to the entire outside surface of a vapor barrier having a metal layer and by protecting this jacket and the vapor barrier from the effects of lightning with an outer metal shield and an outer plastic jacket. This provides adequate lightning protection and permits watertight splice seals despite the filmsiness of the vapor barrier. However, as effective this structure is for some operating conditions, it produces adverse effects in others. For example, the protective structure may affect the crosstalk between conductor pairs in the cable core. This occurs when the relative stranding and twisting of conductors in the cable core is such that the proximity of the metal in the vapor barrier affects the relative capacitances between wires.

In the beforementioned Webster application some of these characteristics, when they are undesirable, are eliminated by bonding the water-obstructing structural plastic jacket to the entire inside surface of a vapor barrier having a metal lamina. However, this increases the possibility of corroding the vapor barrier since the latter generally is in contact with the ground water. In both of these cases the barrier is exposed to abrasion.

An object of this invention is to improve electrical cables, particularly communication cables, for buried underground use, especially by eliminating the above deficiencies.

More generally, an object of this invention is to improve cable systems which involve splices at periodic locations.

Still another object of the invention is to reduce the effect of vapor pumping that leads water into a cable core, while nevertheless eliminating the effects of lightning upon the cable, and still at the same time minimize other detrimental effects.

Yet another object of the invention is to eliminate the effects of cable splices in permitting flow of water from one portion of the cable to another.

Still another object of the invention is to minimize axial water flow in the cable sheath structure.

According to the invention these ends are achieved in whole or in part by bonding both the inner and outer surfaces of a vapor barrier having an aluminum layer sandwiched between two adhesive plastic layers, between a plastic water-obstructing radially rigid under jacket and a similar outer jacket which together are substantially thicker than the vapor barrier, and by covering the composite with an outer plastic jacket. Preferably, an electroconductive lightning shield surrounds the composite innerjacket.

According to another feature of the invention the exchange of water in the splice case between the outer portion of the cable and the cable core due to axial flow is minimized by the splice cases grasping both the composite vapor-barrier-carrying innerjacket and the outerjacket with separate sealing glands whose axial thicknesses are sufficient relative to the radial area to prevent effective vapor migration.

These and other features of the invention are pointed out in the claims. Other objects and advantages of the invention will become known from the following detailed

3 description when read in light of the accompanying drawings wherein:

FIGS. 6, 7 and 8 are sectional views showing other vapor barriers also suitable for use in the cable of FIG. 2 and embodying features of the invention;

FIGS. 9 and 10 are sections illustrating other edges for the vapor barriers shown, respectively, in FIGS. 3, 4, 5, 7 and in FIG. 6, and embodying features of the invention; and FIG. 11 is a sectional view of a splice case in FIG. 1 showing its connection to the cable of FIG. 1 and embodying a feature of the invention.

Figure 1:
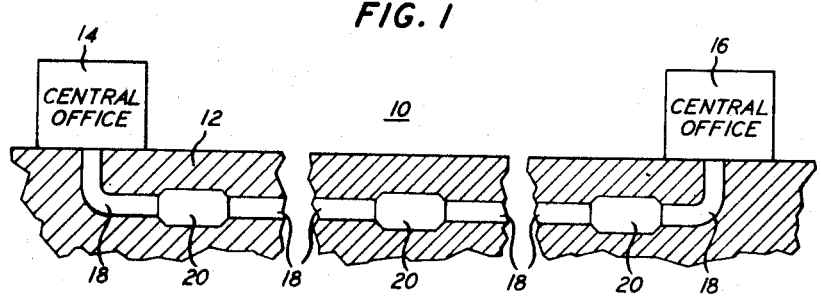
FIG. 1 is a partly sectional schematic diagram showing a cable system embodying features of the invention.

In FIG. 1 a communication cable line 10 embodying features of the invention is buried in the ground 12 for transmitting messages between central offices 14 and 16 which may be in different cities. These central offices in turn receive and send messages to local subscribers on local distribution cables, not shown. The cable line 10 is formed of sections of underground or buried cable 18 also embodying features of the invention which are joined to each other by splices 20. While the cable system described is an interoffice trunk cable, it is recognized that the features of this invention may be equally advantageous for certain of the cables used in local distribution and also long-haul toll circuits.

Figure 2:
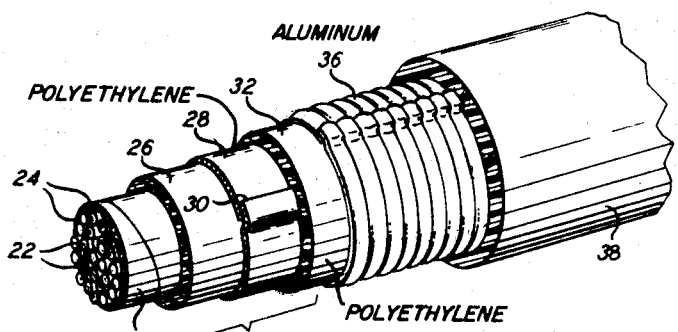
FIG. 2 is a partly sectional perspective view of a cable shown in FIG. 1 and embodying features of the invention.

Details of the cable 18 appear in FIG. 2. Here, a number of separately-insulated conductors 22 are wound with tape or bands 23 to form a cable core 24. The conductors 22 carry messages between the central offices 14 and 16 where they connect to conventional switching networks that join them to local subscriber distribution cables. Wire connectors as shown in Patent No. 3,064,072 join the individual conductors 22 of successive sections of cables 18 in the splices 20.

Surrounding the cable core 24 is a circular extruded underjacket 26 of plastic material such as polyethylene. The latter is by its nature water-obstructing. Bonded to the entire outer surface of the underjacket 26, for protecting the conductors 22 in the core 24 from the entrance of liquid water or water vapor is a vapor barrier 28. The latter has at least one intermediate metal layer and two outer adhesive plastic layers that are heat-sealable to the plastic underjacket 26. The vapor barrier 28 is closed by heat-sealing its plastic layers along an overlapping longitudinal seam 30 that extends throughout the length of the cable. Extruded about and bonded to the outer surface of the vapor barrier 28 is an overjacket 32 also composed of a plastic such as polyethylene.

The underjacket 26 and the overjacket 32 have respective outer and inner surfaces that conform closely to the inner and outer surfaces of the vapor barrier 28 to which they are bonded throughout their respective circumferences. Together the underjacket 26 and the overjacket 32 form a single inner jacket 34 that embraces the vapor barrier 28 in a unitary integral structure. The thicknesses of the underjacket 26 and the outerjacket 32 and their compositions are such that in this integral structure of the inner jacket 34 they are substantially rigid in the radial direction. For example, using cores one-half inch to an inch in diameter, underjackets and overjackets each .040 inch are suitable. The vapor barrier 28 is considerably thiner, thicknesses of .003 inch to .010 inch being suitable. In FIG. 2 and in all the succeeding figures the thickness of the vapor barrier is exaggerated for clarity. The seam 30 in FIG. 2 is sealed for at least the combined thicknesses of the jackets 26 and 32 and preferably three-eighths to one-half inch in the peripheral direction throughout the length of each cable 18.

A transversely-corrugated conductive lightning shield 36 which is longitudinally overlapped surrounds the inner jacket 34. Preferably the shield 36 is composed of aluminum about 8 mils thick. However, it may also be composed of layers of aluminum and steel either bonded or unbonded to each other. Various flooding compounds may be used if necessary for corrosion protection. The corrugated aluminum shield 36 when about 8 mils thick withstands flexure of the cable during handling but is not heavy enough to make the cable stiff. Where used the steel layer or tape affords the shield 36 additional strength and protection against rodent attack. The entire structure is encased in an extruded outer plastic jacket 38 preferably made of polyethylene.

Figure 3:
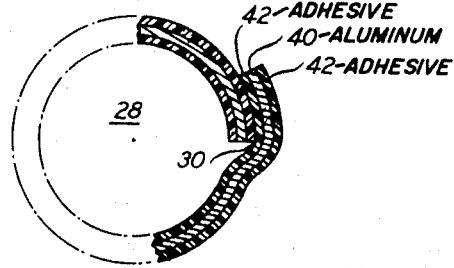
FIGS. 3, 4 and 5 are partly sectional perspective views of embodiments of the vapor barrier used in the cable of FIG. 2 and embodying features of the invention.

According to one embodiment of the invention the vapor barrier 28 is constructed as shown in FIG. 3. Here, a layer 40 of aluminum foil is laminated between two layers 42 of a graft copolymer of polyethylene and monomers with respective carboxyl groups such as acrylic acid or acrylic acid esters. These may for example be those described in U.S. Pats. 2,987,501 and 3,027,346. Suitable materials for layers 42 are available from the Dow Chemical Company of Midland, Mich. under the designation Copolymer Resin QX 3623, QX 4262.6 and the trademark Zetabond. They form both a mechanical and a chemical bond with the aluminum. The thus-formed vapor barrier 28 is overlapped and heat-sealed at the seam 30. The barrier's entire interior surface is heat-sealed and thus bonded to the underjacket 26. The barrier's entire outer surface is heat-sealed and thus bonded to the overjacket 32. In a typical case the aluminum foil layer 40 is one mil thick and the adhesive plastic layers 42 on the aluminum are also one mil thick.

Figure 4:

According to another embodiment of the invention which is illustrated in FIG. 4, the barrier 28 cmoprises an aluminum layer 46 and two plastic layers 48 all corrugated transverse to the cable's axial direction. Here, however, the aluminum layer 46 is approximately eight mills thick. It is chemically and mechanically bonded with one-mil layers 48 of the adhesive material. Using the vapor barrier of FIGS. 3 or 4, the underjacket 26 and the overjacket 32 both conform substantially to the inner and outer surface of the vapor barrier 28. Moreover, in both cases, the seam 30 is overlapped and heat-sealed.

Figure 5:
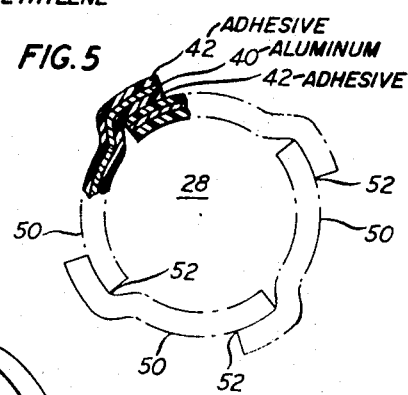

According to another embodiment of the invention the vapor barrier 28 has the structure illustrated in FIG. 5. Here, material such as that shown in FIG. 3, namely, having an aluminum layer 40 between the plastic layers 42, is cut into several strips 50 which are mutually overlapped and heat-sealed to form seams 52. In FIG. 5 four strips 50 are shown. The strips 50 and the seams 52 are each longitudinally directed.

According to still another embodiment of the invention, the vapor barrier 28 is composed of two or more aluminum layers bonded between alternate plastic layers, and with plastic layers outside and inside as shown in FIG. 6. The plastic layers are of the previously-mentioned graft copolymer known as Zetabond. The structure of FIG. 6 affords the barrier redundant vapor-excluding properties. Again, the plastic layers here designated 56 are bonded to the aluminum layers 58 and to each other to form the seam 30. Preferably, these multi-aluminum-layered barriers are corrugated transverse to their longitudinal direction although they need not be.

The redundant vapor-excluding properties available from the barrier 28 in FIG. 6 may also be obtained for the barriers of FIGS. 3 and 4 by wrapping them twice about the core and heat-sealing the plastic interfaces. This forms a helical seam 30 as shown in FIG. 7. In FIG. 7, as in all cases, the vapor barriers' inner and outer surfaces are heat-seled to the underjacket 26 and the overjacket 32.

The vapor barrier 28 may also have the form described in FIG. 3 in the copending Biskeborn application, Ser. No. 599,599, filed concurrently herewith. This is shown herein FIG. 8. Here, an aluminum foil layer 60 as thin as .25% mil is corrugated and filled with heated liquid adhesive plastic, for example the heated liquid form of the before-mentioned graft copolymer 62 in the corrugated interstices. Solid layers 64 and 66 of the same copolymer are then bonded to the inner and outer surfaces of the corrugations and the barrier formed as shown in FIG. 8.

The cable 18 is manufactured according to the invention by first forming the core from the individual conductors 22 and the tape or ribbon 23 in the conventional cable-manufacturing manner. As the core is being completed, the underjacket 26 is extruded about the core. The process continues by wrapping the vapor barrier 28 about the underjacket 26 and overlapping the vapor barrier at the seams 30, 52. The inner jacket 34 is completely by extruding the overjacket 32 about the vapor barrier 28 with sufficient heat and pressure so that the underjacket 26 melts at its outer surfaces and so that the overjacket 32, together with the underjackets 26, fills any open interstices in the interior and exterior surfaces of the vapor barrier 28 and bonds itself throughout the entire surface, both inner and outer, of the vapor barrier while additionally furnishing enough heat to heat-seal the seam 30 or the seam 52. An exemplary temperautre range for this is between 350° to 450° F., but will depend on the specific plastic materials used. If the temperature at which the overjacket 32 is extruded is not high enough to achieve this result, it is then necessary to preheat the vapor barrier and underjacket and apply pressure between the two either pneumatically or with rollers so as to bond the entire outer surface of the underjacket 26 to the vapor barrier 28.

To insure absolutely complete bonding between the underjacket 26 and the overjacket 32 on the one hand and the vapor barrier 28 on the other, the edges of the vapor barriers in FIGS. 3, 4, 5 and 7, according to yet another embodiment of the invention are covered with adhesive as shown in FIG. 9. Here the plastic layers 42, which correspond to layers with like reference numerals in FIGS. 3, 5, and 7, and also to the layers 48 in FIG. 4, extend beyond the edge of the metal layers 40 and 52, and are sealed to each other. A like form for the edges of the barrier in FIG. 6 appears in FIG. 10. Here, the plastic layers 56 are also bonded to each other.

Vapor barriers 28 using the edges of FIGS. 9 and 10 require preforming each vapor barrier strip separately from predetermined widths of vapor barrier material. Practically, it is much simpler to preform each vapor barrier by cutting lengths from a large laminated sheet. However, such cut vapor barriers have no edge coverings. Wrapped about a core and covered with the under and overjackets 26 and 32, the uncovered edges may leave unbonded longitudinal sections at the edges where the over and underjackets 26 and 32 abut against the aluminum. Nevertheless, since the thickness of the aluminum is slight, and since the over and underjackets 26 and 32 fit snugly against the aluminum edges, such lack of bonding is usually acceptable in practice. Thus, either method of preforming, namely, separately forming or cutting of lengths, is contemplated by the invention.

The cable manufacturing continues by wrapping the shield 36 about the polyethylene overjacket 32 and extruding the outer jacket 38 about it.

The invention contemplates coating the shield 36 with plastic bonding material so that the outer jacket 38 when extruded over the shield 36 closes the seam at the shield and adheres to it. This alternative is usable mainly where comparatively stiff cable is acceptable.

The cable is used by burying it in the ground or placing it in ducts and connecting the conductors 22 to suitable connectors at each central office 14 and 16. In the splices 20, wire connectors as disclosed in Pat. 3,064,072 join the conductors 22. These connections are protected in the splices as shown in FIG. 11. Here, two splices case sections 72 and 74 are bolted together at flanges 76 and 78. The inner jacket 34 composed of the underjacket 26 and the overjacket 32, as well as the outer jacket 38 are stripped back from the end of the cable as shown in FIG. 11. The splice case sections 72 and 74 form a pressure fit about the jackets 34 and 38. This is done by glands. Specifically, a gland 80 formed by the end of the sections 72 and 74 embraces two discs 82 and 84 which carry between them a so-called "B sealing compound" 86 composed of a puttylike substance that under pressure forms an airtight joint about the jacket 34. The compound 86 is a mixture of rubber, butyls, and other materials which prevent it from hardening or shrinking with age while maintaining its mechanical pressure against the jacket surface.

The jackets 34 and 38 hold the cable in position within the splice case. Particularly, flanges 76 and 78 squeeze the jacket 38 with an annular protrusion 88. This presses the jacket 38, whose end is flared by longitudinal cuts, and a similarly flared shield 36 against a ring 90 that rests on the jacket 34. The ring 90 possesses ends that project through the longitudinal flaring cuts in the shield 36 and the jacket 38 to make electrical contact with the annular protrusion 88 of the section 72. A second gland 94 for producing watertight contact between the splice case and the outer jacket 38 is formed by suitable annular protrusions 96. These hold lead discs 98 and 100 so that radial pressure from the flanges 76 and 78 press more B sealing compound 102 between the sections 72, 74 and the jacket 38.

In use, the cable's outer jacket 38 generally is susceptible to ground water that collects about the polyethylene jacket due both to so-called pumping from temperature variations and lightening-made holes. Water thus inevitably reaches the surfaces of the shield 36. There the water seeps through the shield overlap. While the shield 36 may be made watertight, lightning inevitably burns holes that allow further passage of water. This water flows both circumferentially and axially through the cable. Water vapor then migrates through, or permeates the polyethylene overjacket 32 at a comparatively slow rate. This permeation, however, is limited by the existence of the metal layer in the vapor barrier 28. Any vapor that reaches the aluminum layer of the vapor barrier is stopped thereby. The aluminum layer is effective for excluding both water and water vapor from the underjacket 26 and the core. At the seam 30, the plastic permits some vapor migration and hence some pumping. This accounts for the migration of any water vapor at all to the aluminum surface in the vapor barrier. However, since the distance between the aluminum layers in the seam 30 is small and the circumferential dimension of the seam large, the rate of vapor flow is too slow to respond significantly to cyclical temperature-engendered vapor differentials. Thus, the barrier represented by the plastic in the seam is adequate for keeping the core substantially dry over the cable's 30-to-50-year life expectancy.

The overjacket 32 protects the vapor barrier 28 from the effects of corrosion and erosion which may occur as a result of flexing the cable. During such flexing the metal shield 36 is otherwise likely to scrape away portions of the adhesive plastic layers in the vapor barrier and expose the metal in the barrier to corrosion and further erosion or scratching.

The under and overjackets 26 and 32 by tightly holding the vapor barrier 28 limit its opportunity to form pinholes or cracks in response to cable handling. This ability to maintain the integrity of the metal in the vapor barrier assures a substantially water-free core for the cable's lifetime.

At the cable splice 20, water traveling axially under the jacket 38 and the shield 36 can enter the portion of the splice between the glands 94 and 80. However, here no free axial path is available and the pumping rate is limited by the lead discs 84 and 82 as well as the width of the compound 86 and the comparatively long distance of the jacket 34 to one too slow to be significantly affected by temperature cycles. The radial rigidity of the composite inner jacket 34 permits the cable to withstand the radially inward forces of the glands and thereby prevent the axial excursion within the splice case.

While conceivably the lack of bonds at the seam 30 between the aluminum layer or layers and the underjacket 26 as well as the overjacket 32 might, when the embodiments of the FIGS. 9 and 10 are not used, furnish an axial flow path for water, this path is substantially insignificant. The pumping action by virtue of which water migrates through the polyethylene requires a significant void in which vapor can collect and condense. By hugging the aluminum edge fast such pumping is substantially avoided. Axial water flow is therefore minimized.

In one embodiment of the invention the shield 36 is eliminated altogether. Cables with this structure offer many years of effective use. When lightning strikes the shieldless cable it does indeed puncture the metal in vapor barrier 28. However, the vapor barrier metal protects the underjacket 26. This is so especially when the barrier uses heavy metal as in FIG. 4. The bond between the vapor barrier and the underjacket 26 prevents water from flowing anywhere inside the vapor barrier 28 to the underjacket 26 except at the actual puncture point. Thus no water actually can flow through the underjacket 26. Pumping pressure occurs only at the lightning puncture point which is small enough to prevent significant accumulation of condensate within the cable core over long periods.

While embodiments of the invention have been described in detail, it will be obvious to those skilled in the art that the invention may be embodied otherwise without departing from its spirit and scope.

What is claimed is:

1. An electrical communication cable comprising a core of communications-carrying conductor means for transmitting messages electrically, longitudinally seamed vapor barrier means surrounding said core and having a metal layer, fluid-obstructing structural support means bonded to substantially the entire outer and inner surfaces of said vapor barrier means and conforming at the vapor barrier means to the shape of the outer and inner surfaces of said vapor barrier means, said structural means including a plastic underjacket bonded on the outside to the entire inside surface of said vapor barrier means and a plastic overjacket surrounding said vapor barrier means and bonded on the inside to the entire outside surface of said vapor barrier means and having a smooth substantially unbroken and round outer periphery, said structural means being altogether substantially thicker than said vapor barrier means and having a substantially greater resistance to radial distortion than said vapor barrier means, electroconductive lightning shield means surrounding said structural means, said shield means including a conductive layer and a mechanically protective layer, and a plastic jacket surrounding said structural means.

2. An electrical communication cable comprising a core of communications-carrying conductor means for transmitting messages electrically, vapor barrier means surrounding said core and having a metal layer and two adhesive plastic layers adhering to opposite sides of said metal layer, said vapor barrier means forming a longitudinally overlapping seam with said adhesive plastic layers bonding the overlap, said longitudinal seam being greater in peripheral width than the periphery of said vapor barrier means, fluid-obstructing structural support means bonded to substantially the entire outer and inner surfaces of said vapor barrier means by said adhesive plastic layers and conforming at the vapor barrier means to the shape of the outer and inner surfaces of said vapor barrier means, said structural means including a plastic underjacket bonded on the outside to the entire inside surface of said vapor barrier means and a plastic overjacket surrounding said vapor barrier means and bonded on the inside to the entire outside surface of said vapor barrier means and having a smooth substantially unbroken and round outer periphery, said structural means being altogether substantially thicker than said vapor barrier means and having a substantially greater resistance to radial distortion than said vapor barrier means, and a plastic jacket surrounding said structural means.

3. An electrical communincation cable comprising a core of communications-carrying conductor means for transmitting messages electrically, vapor barrier means surrounding said core and having a plurality of metal laminated strips extending longitudinally and overlapping each other to form a plurality of overlapping seams, fluid-obstructing structural support means bonded to substantially the entire outer and inner surfaces of said vapor barrier means and conforming at the vapor barrier means to the shape of the outer and inner surfaces of said vapor barrier means, said structural means including a plastic underjacket bonded on the outside to the entire inside surface of said vapor barrier means and a plastic overjacket surrounding said vapor barrier means and bonded on the inside to the entire outside surface of said vapor barrier means and having a smooth substantially unbroken and round outer periphery, said structural means being altogether substantially thicker than said vapor barrier means and having a substantially greater resistance to radial distortion than said vapor barrier means, and a plastic jacket surrounding said structural means.

References Cited

UNITED STATES PATENTS

| | | | |
|---|---|---|---|
| 3,315,025 | 5/1967 | Tomlinson | 174—107 |
| 3,340,353 | 9/1967 | Mildner | 174—105 X |
| 3,233,036 | 1/1966 | Jachimowicz | 174—107 |
| 3,339,007 | 8/1967 | Blodgett | 174—25 |
| 3,272,911 | 9/1966 | Rollins et al. | 174—106 |
| 3,031,523 | 4/1962 | Howard | 174—102 |
| 3,379,821 | 4/1968 | Garner | 174—36 |
| 2,957,038 | 10/1960 | Greenidge et al. | 174—77 X |
| 3,344,228 | 9/1967 | Woodland et al. | 174—107 |

FOREIGN PATENTS

| | | |
|---|---|---|
| 678,408 | 1/1964 | Canada. |
| 1,419,843 | 10/1964 | France. |
| 644,973 | 7/1964 | Belgium. |

OTHER REFERENCES

Kearney: Airseal, Elec. World, Dec. 4, 1950, p. 57.

LARAMIE E. ASKIN, Primary Examiner

A. T. GRIMLEY, Assistant Examiner

U.S. Cl. X.R.

174—110